(12) United States Patent
Ferguson et al.

(10) Patent No.: US 10,954,450 B2
(45) Date of Patent: Mar. 23, 2021

(54) START-UP PROCEDURE FOR A FISCHER-TROPSCH PROCESS

(71) Applicant: BP P.L.C., London (GB)

(72) Inventors: Ewen James Ferguson, Beverley (GB); Manuel Ojeda Pineda, Hull (GB); Alexander James Paterson, Hull (GB)

(73) Assignee: BP P.L.C., London (GB)

( * ) Notice: Subject to any disclaimer, the term of this patent is extended or adjusted under 35 U.S.C. 154(b) by 0 days.

(21) Appl. No.: 16/485,368

(22) PCT Filed: Feb. 9, 2018

(86) PCT No.: PCT/EP2018/053349
§ 371 (c)(1),
(2) Date: Aug. 12, 2019

(87) PCT Pub. No.: WO2018/146276
PCT Pub. Date: Aug. 16, 2018

(65) Prior Publication Data
US 2019/0367815 A1 Dec. 5, 2019

(30) Foreign Application Priority Data
Feb. 10, 2017 (GB) .................. 1702248.4

(51) Int. Cl.
*C10G 2/00* (2006.01)
*B01J 23/75* (2006.01)
*B01J 23/80* (2006.01)

(52) U.S. Cl.
CPC .............. *C10G 2/332* (2013.01); *B01J 23/75* (2013.01); *B01J 23/80* (2013.01); *C10G 2300/4012* (2013.01); *C10G 2300/4031* (2013.01); *C10G 2300/703* (2013.01)

(58) Field of Classification Search
CPC ............ C10G 2/332; C10G 2300/4012; C10G 2300/4031; C10G 2300/703; B01J 23/75; B01J 23/80
See application file for complete search history.

(56) References Cited

U.S. PATENT DOCUMENTS

| 4,826,800 A | 5/1989 | McAteer |
|---|---|---|
| 7,005,456 B2 | 2/2006 | Freide |
| 9,868,117 B2 | 1/2018 | Detjen et al. |
| 2016/0160128 A1 | 6/2016 | Stobbe et al. |

FOREIGN PATENT DOCUMENTS

| CA | 1205092 A | 5/1986 | |
|---|---|---|---|
| EP | 2940102 A1 | 4/2015 | |
| EP | 2940102 A1 | 11/2015 | |
| WO | 03/035257 A1 | 5/2003 | |
| WO | 06/075216 A1 | 7/2006 | |
| WO | WO-2007009954 A1 * | 1/2007 | ............... C10G 2/32 |
| WO | 2016/091696 A1 | 6/2016 | |

OTHER PUBLICATIONS

International Search Report and Written Opinion of the International Searching Authority for International Application No. PCT/EP2018/053349, dated Apr. 12, 2018.

* cited by examiner

*Primary Examiner* — Jafar F Parsa
(74) *Attorney, Agent, or Firm* — McDonnell Boehnen Hulbert & Berghoff LLP

(57) ABSTRACT

The present invention generally relates to a Fischer-Tropsch process, in particular a Fischer-Tropsch process for converting a feed comprising a mixture of hydrogen and carbon monoxide gases, preferably in the form of a synthesis gas mixture, to hydrocarbons by contacting a cobalt-containing Fischer-Tropsch synthesis catalyst with a mixture of hydrogen and carbon monoxide in a reactor at a pressure of 4.0 MPa absolute or greater, wherein the process is initiated by a start-up procedure comprising the steps of: i) providing a feed comprising a mixture of hydrogen and carbon monoxide gases, preferably in the form of a synthesis gas mixture, to a reactor containing a cobalt-containing Fischer-Tropsch synthesis catalyst, wherein the pressure inside the reactor is 3.5 MPa absolute or below; and ii) maintaining the feed to the reactor, removing a product stream comprising hydrocarbons and maintaining the pressure inside the reactor at 3.5 MPa absolute or below for at least 15 hours, preferably for at least 50 hours.

18 Claims, No Drawings

START-UP PROCEDURE FOR A FISCHER-TROPSCH PROCESS

This application is a national stage application under 35 U.S.C. § 371 of International Application No. PCT/EP2018/053349, filed Feb. 9, 2018, which claims priority to Great Britain Patent Application No. GB 1702248.4, filed Feb. 10, 2017, the disclosures of which are explicitly incorporated by reference herein.

This invention relates to a process for converting a mixture of hydrogen and carbon monoxide to hydrocarbons. In particular, the invention relates to a Fischer-Tropsch process wherein the process is initiated by a start-up procedure, producing a catalyst having improved activity, by means of which it is possible to obtain improved selectivity for $C_{5+}$ hydrocarbons and improved conversion. The invention additionally relates to catalysts produced by said start-up procedure and methods and uses of involving such catalysts.

The conversion of synthesis gas into hydrocarbons by the Fischer-Tropsch process has been known for many years. The growing importance of alternative energy sources has seen renewed interest in the Fischer-Tropsch process as one of the more attractive direct and environmentally acceptable routes to high quality transportation fuels.

Many metals, for example cobalt, nickel, iron, molybdenum, tungsten, thorium, ruthenium, rhenium and platinum are known to be catalytically active, either alone or in combination, in the conversion of synthesis gas into hydrocarbons and oxygenated derivatives thereof. Of the aforesaid metals, cobalt, nickel and iron have been studied most extensively. Generally, the metals are used in combination with a support material, of which the most common are alumina, silica and carbon.

In the preparation of cobalt-containing Fischer-Tropsch catalysts, a solid support is typically impregnated with a cobalt-containing compound, which may for instance be an organometallic or inorganic compound (e.g. $Co(NO_3)_2 \cdot 6H_2O$), by contacting with a solution of the compound. The particular form of cobalt-containing compound is generally selected for its ability to form a cobalt oxide (for instance, CoO, $Co_2O_3$ or $Co_3O_4$) following a subsequent calcination/oxidation step. Following generation of the supported cobalt oxide, a reduction step is necessary in order to form the pure cobalt metal as the active catalytic species. Thus, the reduction step is also commonly referred to as an activation step.

Various different methods of either activating a fresh Fischer-Tropsch catalyst or regenerating a used Fischer-Tropsch catalyst have been proposed. Historically, supported cobalt oxide catalyst precursors were reduced by means of hydrogen at elevated temperature, before being transferred under inert conditions to the reactor. Typically, reduction in the presence of hydrogen is conducted at above 300° C. For example, WO 03/035257 and WO 06/075216 disclose a two-step reduction of a Fischer-Tropsch catalyst precursor with hydrogen, wherein the final reduction stage is conducted with pure hydrogen gas at a temperature of from 300° C. to 600° C.

It is generally understood that selectivity for $C_{5+}$ hydrocarbons in the Fischer-Tropsch synthesis reaction is increased by operating at lower temperatures. By providing a catalyst of higher activity, it is possible to achieve the same level of synthesis gas conversion at lower temperatures whilst benefitting from improved $C_{5+}$ hydrocarbon selectivity. As such, a catalyst of higher activity also represents a means for modifying the selectivity of the Fischer-Tropsch synthesis by allowing a reduction in operating temperature.

In a typical Fischer-Tropsch process, a reactor is charged with the catalyst and a flow of syngas is provided to the reactor. The temperature and pressure are then raised to give the desired reaction conditions, which are maintained throughout the process. It is generally understood that increased pressure can aid performance by increasing the partial pressures of reactants within the pores of the catalyst. If a higher operating pressure is desired to achieve a particular activity, then this pressure is used from the start-up of the process and maintained throughout.

It has now been surprisingly found that by implementing a start-up procedure in a Fischer-Tropsch reaction where a pressure of 3.5 MPa or below is maintained initially, followed by operation of the process at a pressure of 4.0 MPa or greater, improved selectivity for $C_{5+}$ hydrocarbons and improved conversion can be obtained in the Fischer-Tropsch process in comparison to an equivalent process which differs only in the absence of the start-up procedure.

The present invention thus provides a Fischer-Tropsch process for converting a feed comprising a mixture of hydrogen and carbon monoxide gases, preferably in the form of a synthesis gas mixture, to hydrocarbons by contacting a cobalt-containing Fischer-Tropsch synthesis catalyst with a mixture of hydrogen and carbon monoxide in a reactor at a pressure of 4.0 MPa absolute or greater, wherein the process is initiated by a start-up procedure comprising the steps of:

i) providing a feed comprising a mixture of hydrogen and carbon monoxide gases, preferably in the form of a synthesis gas mixture, to a reactor containing a cobalt-containing Fischer-Tropsch synthesis catalyst, wherein the pressure inside the reactor is 3.5 MPa absolute or below; and ii) maintaining the feed to the reactor, removing a product stream comprising hydrocarbons and maintaining the pressure inside the reactor at 3.5 MPa absolute or below for at least 15 hours, preferably at least 50 hours.

It has been found that the Fischer-Tropsch process of the present invention, using a lower start-up pressure and a higher operation pressure, results in improved selectivity for $C_{5+}$ hydrocarbons and improved conversion in comparison to an equivalent process operating at only the lower or higher pressure adopted for the start-up procedure or subsequent operation of the Fischer-Tropsch process, respectively.

Without wishing to be bound by any particular theory, it is believed that, despite using at least a partially pre-activated catalyst, a final activation stage to form the final state of the cobalt-containing catalyst occurs during the initial stages of the start-up procedure upon exposure to hydrogen and carbon monoxide. By providing milder pressure conditions during this final activation of the catalyst, it is believed that a more active catalyst is formed. Thus, when the catalyst is subsequently deployed in a Fischer-Tropsch process operating with a higher operating pressure, it is able to outperform an equivalent catalyst deployed in a Fischer-Tropsch process operated under equivalent conditions which has not undergone the lower pressure start-up procedure. In particular, it is believed that the lower pressure start-up procedure may lead to the formation of an enhanced level of available active cobalt metal, or otherwise favourable distribution of available active cobalt metal over the catalyst surface (i.e. a physical difference in catalyst topography and/or morphology), giving rise to the superior $C_{5+}$ hydrocarbon selectivity in subsequent Fischer-Tropsch reactions. This is particularly surprising as conventional processes employing the same initial catalyst composition but at the stepped-up pressure (i.e. the high operating pressure employed following the start-up procedure according to the present invention) would be expected to show equivalent catalyst activity. The process of the invention also outperforms processes operating constantly at the initial lower pressure employed in the start-up procedure of the present invention, indicating that the combination of the particular start-up procedure with the final operating pressure is critical for obtaining the benefit of the invention.

Any suitable pressure below 3.5 MPa may be used in steps i) and ii) of the process. In some embodiments, the pressure during steps i) and ii) of the start-up procedure is 3.3 MPa absolute or below, preferably 2.5 MPa or below, for example 1.5 MPa or below. Preferably, the pressure during steps i) and ii) of the start-up procedure is greater than 0.2 MPa, preferably greater than 0.5 MPa, for example greater than 1.0 MPa.

In preferred embodiments, the pressure in the reactor for the Fischer-Tropsch process conducted after completion of the start-up procedure is from 0.5 MPa to 3.5 MPa higher than the pressure in step i) and/or step ii), preferably 0.5 MPa to 2.5 MPa higher, more preferably 0.5 MPa to 1.5 MPa higher, most preferably 0.75 MPa to 1.25 MPa higher, for example 1.0 MPa higher.

It will be understood that, unless otherwise specified, pressures referred to herein are absolute pressures, where atmospheric pressure is 0.1 MPa.

The pressure in the reactor during step ii) of the start-up procedure may be maintained for any suitable amount of time, provided it is a period of at least 15 hours, preferably at least 50 hours. It will be appreciated that the precise time may vary depending on the other reaction conditions used. Generally, it is desired for steady-state conditions to be obtained during step ii) of the start-up procedure. In preferred embodiments, the pressure in the reactor in step ii) of the start-up procedure is maintained for 100 to 600 hours, more preferably for 200 to 500 hours.

In some embodiments, the pressure and/or temperature in the reactor during step i) of the start-up procedure is different from the pressure and/or temperature in the reactor during step ii) of the start-up procedure.

In preferred embodiments, the temperature in the reactor during the start-up procedure is different from the temperature in the reactor for the Fischer-Tropsch process conducted after completion of the start-up procedure, preferably wherein the temperature in the reactor for the Fischer-Tropsch process conducted after completion of the start-up procedure is less than the temperature in the reactor during the start-up procedure.

It will be appreciated that any suitable temperature may be used during the start-up procedure or subsequent Fischer-Tropsch process which provides an adequate conversion and does not risk thermal deformation of the catalyst. Suitably, the start-up procedure and/or the subsequent Fischer-Tropsch process following the start-up procedure is conducted at a temperature in the range of from 100 to 400° C., preferably from 150 to 350° C., and more preferably from 150 to 250° C. Temperature may vary over the course of the start-up procedure and/or the subsequent Fischer-Tropsch process following the start-up procedure according to the present invention. For instance, temperature may be increased incrementally until a desired level of conversion is achieved. Alternatively, a substantially constant temperature may be applied.

Suitably, the pressure in the reactor during the Fischer-Tropsch process conducted after completion of the start-up procedure is less than 10.0 MPa absolute, preferably less than 7.5 MPa absolute, more preferably less than 5.0 MPa absolute.

Preferably, the start-up procedure occurs in the same reactor as where the Fischer-Tropsch process is conducted after completion of the start-up procedure, although it will be appreciated that it will be possible to conduct these steps in separate reactors.

In preferred embodiments, the $C_{5+}$ selectivity during the Fischer-Tropsch process conducted after completion of the start-up procedure is at least 70%, preferably at least 75%, more preferably at least 80%.

In preferred embodiments, the $C_{5+}$ productivity during the Fischer-Tropsch process conducted after completion of the start-up procedure is at least 90 g/L·h, preferably at least 100 g/L·h, more preferably at least 110 g/L·h. The productivity of the catalyst is defined as the weight in grams of products containing 5 carbon atoms or more ($C_{5+}$), formed over the catalyst per litre of packed catalyst volume per hour of reaction time.

In preferred embodiments, the $CH_4$ selectivity during the Fischer-Tropsch process conducted after completion of the start-up procedure is less than 15%, more preferably less than 13%.

In preferred embodiments, the CO conversion during the Fischer-Tropsch process conducted after completion of the start-up procedure is greater than 60%, preferably greater than 63%, more preferably greater than 65%.

It will be appreciated that values for CO conversion, $CH_4$ selectivity, $C_{5+}$ selectivity, and $C_{5+}$ productivity are average values obtained at steady state, typically over a period of around 200 to 700 hours on stream.

At least prior to the start-up procedure of the process of the present invention, the cobalt-containing catalyst referred to herein comprises, at least in part, a reducible cobalt species which may upon reduction be converted to cobalt metal, i.e. the predominant catalytic species. In particular, the cobalt-containing catalyst preferably at least partially comprises cobalt in the form of an oxide, for example CoO, $Co_2O_3$ and/or $Co_3O_4$, at least prior to the start-up procedure. In some embodiments, prior to the start-up procedure of the process of the present invention, the catalyst will be partially reduced by any suitable method, for example using a hydrogen-containing stream, preferably a hydrogen/nitrogen stream. The partial reduction may be carried out prior to transferring the catalyst to the reactor where the start-up procedure takes place, or may be conducted in the same reactor prior to the start-up procedure.

The cobalt-containing catalyst for use in accordance with the process of the invention may be a freshly prepared catalyst material. Alternatively, the cobalt-containing catalyst may be obtained from a cobalt-containing material which has previously been used for catalyzing a Fischer-Tropsch reaction. If necessary, the cobalt-containing material which has previously been used for catalyzing a Fischer-Tropsch reaction is subjected to a passivation step, so as to convert at least a part of the cobalt contained in the material into the oxide form.

Generally, the cobalt-containing material which has previously been used in a Fischer-Tropsch reaction may be passivated by treating at elevated temperature with a gas containing molecular oxygen, such as air, prior to use in accordance with the present invention. Such passivation desirably increases the proportion of oxidic cobalt in the cobalt-containing material which has been previously used in a Fischer-Tropsch reaction. The elevated temperature for this passivation is usually in the range of from 30° C. to 500°

C., preferably 60° C. to 150° C. The treatment may be carried out at any desired pressure, atmospheric pressure being preferred.

The optimum treatment time will depend upon the history of the cobalt-containing material, on the oxygen content of the gas used and on the treatment conditions. The treatment time should in general be of sufficient length to remove any carbonaceous residues present on the cobalt containing material, and is thus especially useful with a cobalt-containing material which has previously been used in Fischer-Tropsch reactions. Treatment times of at least 30 minutes, preferably from 1 to 48 hours, are preferred.

The cobalt-containing Fischer-Tropsch catalyst may be unsupported or preferably supported on a conventional refractory support material, for example silica, alumina, silica/alumina, ceria, titania, gallia, zirconia, magnesia, zinc oxide or the like and mixtures thereof, preferably the support material is zinc oxide or a mixture comprising zinc oxide.

The cobalt-containing Fischer-Tropsch catalyst may be prepared by any suitable method of which the skilled person is aware. For example, it may be prepared by impregnation, precipitation or gelation. A suitable Fischer-Tropsch catalyst may also be prepared by mulling or kneading a support material, such as alumina, silica or zirconia, with either of a soluble or insoluble cobalt compound, before extruding, drying and calcining the product.

A suitable impregnation method, for example, comprises impregnating a support material with a compound of cobalt which is thermally decomposable to the oxide form. Any suitable impregnation technique including the incipient wetness technique or the excess solution technique, both of which are well-known in the art, may be employed. The incipient wetness technique is so-called because it requires that the volume of impregnating solution be predetermined so as to provide the minimum volume of solution necessary to just wet the entire surface of the support, with no excess liquid. The excess solution technique as the name implies, requires an excess of the impregnating solution, the solvent being thereafter removed, usually by evaporation.

The impregnation solution may suitably be either an aqueous solution or a non-aqueous, organic solution of the thermally decomposable cobalt compound. Suitable non-aqueous organic solvents include, for example, alcohols, ketones, liquid paraffinic hydrocarbons and ethers. Alternatively, aqueous organic solutions, for example an aqueous alcoholic solution, of the thermally decomposable cobalt compound may be employed.

Suitable soluble compounds include for example the nitrate, acetate or acetylacetonate, preferably the nitrate, of cobalt. It is preferred to avoid the use of the halides of cobalt because these have been found to be detrimental.

Impregnation may be conducted with a support material which is in a powder, granular or pelletized form. Alternatively, impregnation may be conducted with a support material which is in the form of a shaped extrudate.

Where a preformed support or an extrudate is impregnated, it will be appreciated that the support may be contacted with the impregnating solution by any suitable means including, for instance, vacuum impregnation, incipient wetness or immersion in excess liquid.

Where a powder or granulate of support material is impregnated, the powder or granulate may be admixed with the impregnating solution by any suitable means of which the skilled person is aware, such as by adding the powder or granulate to a container of the impregnating solution and stirring. Where an extrusion step immediately follows impregnation of a powder or granulate, the mixture of powder or granulate and impregnating solution may be further processed if it is not already in a form which is suitable for extruding. For instance, the mixture may be mulled to reduce the presence of larger particles that may not be readily extruded, or the presence of which would otherwise compromise the physical properties of the resulting extrudate. Mulling typically involves forming a paste which is suitable for shaping by extrusion. Any suitable mulling or kneading apparatus of which the skilled person is aware may be used for mulling in the context of the present invention. For example, a pestle and mortar may suitably be used in some applications or a Simpson muller may suitably be employed. Mulling is typically undertaken for a period of from 3 to 90 minutes, preferably for a period of 5 minutes to 30 minutes. Mulling may suitably be undertaken over a range of temperatures, including ambient temperatures. A preferred temperature range for mulling is from 15° C. to 50° C. Mulling may suitably be undertaken at ambient pressures. It will be appreciated that complete removal of bound solvent from the impregnation solution may be conducted to effect complete precipitation after extrusion.

In embodiments where a calcination step is performed on an impregnated powder or granulate, thereby completely removing solvent of the impregnation solution, the calcined powder or granulate may also be further processed in order to form a mixture which is suitable for extruding. For instance, an extrudable paste may be formed by combining the calcined powder or granulate with a suitable solvent, for example a solvent used for impregnation, preferably an aqueous solvent, and mulled as described above.

In some embodiments, an extrudate or preformed support is converted into a powder or granulate. This may be achieved by any suitable means of which the person of skill in the art is aware. For instance, the impregnated support material, which may in some embodiments be a dry extrudate, may be crushed and/or ground/milled. In preferred embodiments, the powder which is formed has a median particle size diameter (d50) of the less than 50 μm, preferably less than 25 μm. Where a granulate is instead formed, the median particle size diameter (d50) of the granulate is preferably from 300 to 600 μm. Particle size diameter (d50) may suitably be determined by means of a particle size analyser (e.g. Microtrac S3500 Particle size analyser).

A suitable precipitation method for producing the cobalt-containing catalyst comprises, for example, the steps of: (1) precipitating at a temperature in the range from 0° C. to 100° C. cobalt in the form of an insoluble thermally decomposable compound thereof using a precipitant comprising ammonium hydroxide, ammonium carbonate, ammonium bicarbonate, a tetraalkylammonium hydroxide or an organic amine, and (2) recovering the precipitate obtained in step (1).

In contrast to impregnation methods, any soluble salt of cobalt may be employed. Suitable salts include, for example, carboxylates, chlorides and nitrates. It is preferred to use aqueous solutions of the cobalt salt(s), although aqueous alcoholic solutions for example may be employed if desired.

As regards the precipitant, in addition to ammonium carbonate, ammonium bicarbonate and ammonium hydroxide, tetraalkylammonium hydroxides and organic amines may also be used. The alkyl group of the tetraalkylammonium hydroxide may suitably be a $C_1$ to $C_4$ alkyl group. A suitable organic amine is cyclohexylamine. Experiments have shown that the use of alkali metal precipitants lead to very much inferior catalysts. It is therefore preferred to avoid the presence of alkali metals in the catalyst composition. Compositions free from alkali metal may suitably be produced using as the precipitant either ammonium carbonate or ammonium bicarbonate, even more preferably ammonium bicarbonate. Ammonium carbonate may suitably be used in a commercially available form, which comprises a mixture of ammonium bicarbonate and ammonium carbonate. Instead of using a pre-formed carbonate or bicarbonate it is possible to use the precursors of these salts, for example a soluble salt and carbon dioxide.

Irrespective of the method for preparing the cobalt-containing material, it is usually necessary to convert the cobalt-containing material into a catalyst comprising cobalt in the oxide form, for subsequent partial reduction and/or use in accordance with the present invention. Calcination may be used to afford a catalyst comprising cobalt in the oxide form by, for instance, causing thermal-decomposition of a thermally decomposable compound of cobalt formed previously. Calcination may be performed by any method known to those of skill in the art, for instance in a fluidized bed or rotary kiln at a temperature suitably in the range from 200° C. to 700° C. In some embodiments, calcination may be conducted as part of an integrated process also comprising the reductive activation and performed in the same reactor.

In preferred embodiments, the cobalt-containing Fischer-Tropsch synthesis catalyst comprises one or more promoters, dispersion aids, strength aids and/or binders.

Promoters, which may promote reduction of an oxide of cobalt to cobalt metal, preferably at lower temperatures, are preferably selected from the list consisting of ruthenium, palladium, platinum, rhodium, rhenium, manganese, chromium, nickel, iron, molybdenum, boron, tungsten, zirconium, gallium, thorium, lanthanum, cerium and mixtures thereof.

Promoter is typically used in a cobalt to promoter atomic ratio of up to 250:1 and more preferably up to 125:1, still more preferably up to 25:1, and most preferably 10:1. A promoted catalyst may be prepared by a variety of methods including impregnation, extrusion, precipitation or gelation.

The promoter may be added at one or more of the catalyst preparation stages including: during precipitation as a soluble compound; precipitation by incipient wetness impregnation; or following calcination of the cobalt comprising precipitate.

The cobalt-containing catalyst may also be a composition additionally comprising zinc oxide, as described, for instance, in U.S. Pat. No. 4,826,800. Such a composition is preferably made by the preferred process described therein.

Following the start-up procedure according to the process of the present invention, a Fischer-Tropsch process is conducted to convert a feed comprising a mixture of hydrogen and carbon monoxide gases to hydrocarbons, for example a diesel or aviation fuel or precursor thereof. Fischer-Tropsch synthesis of hydrocarbons from syngas may be represented by Equation 1:

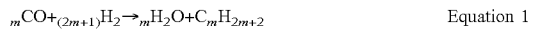

$$m\text{CO} + (2m+1)\text{H}_2 \rightarrow m\text{H}_2\text{O} + \text{C}_m\text{H}_{2m+2} \qquad \text{Equation 1}$$

As discussed hereinbefore, the process of the present invention has been surprisingly found to afford a particularly active cobalt-containing Fischer-Tropsch catalyst exhibiting high $C_{5+}$ hydrocarbon selectivity, which hydrocarbon distribution desirably encompasses $C_5$ to $C_9$ gasoline and $C_{10}$-$C_{20}$ diesel fractions.

In the feed gas used in steps i) and ii) of the start-up procedure and during the subsequent Fischer-Tropsch process of the invention, the volume ratio of hydrogen to carbon monoxide ($H_2$:CO) in the feed (e.g. in the feed and/or at the reactor inlet) is preferably in the range of from 0.5:1 to 5:1, more preferably from 1:1 to 3:1, and most preferably 1.6:1 to 2.2:1. The gaseous reactant stream may also comprise other diluent/inert gaseous components, such as nitrogen, carbon dioxide, water, methane and other saturated and/or unsaturated light hydrocarbons. In some embodiments, such diluent/inert gaseous components may be present at a concentration of from 1% to 75% by volume, from 5% to 60% by volume, or from 10% to 50% by volume. In other embodiments, diluent/inert gaseous components that may be present in the gaseous reactant stream in addition to the reactant gases are present at a concentration of less than 50% by volume, such as less than 30% by volume, or less than 20% by volume. As will be appreciated, diluent/inert gases in a product effluent stream obtained from the reactor may be recycled to the gaseous reactant stream or used in other downstream processes, if desired.

The gaseous reactants for the start-up procedure and/or the subsequent Fischer-Tropsch process following the start-up procedure may be fed into the reactor either separately or pre-mixed (e.g. as in the case of syngas). They may initially all contact the solid catalyst at the same portion of the solid catalyst, or they may be added at different positions of the solid catalyst. The initial point of contact of the one or more reactants with the solid catalyst is the point at which all the reactants initially contact each other in the gas-phase and in the presence of the solid catalyst. Preferably, the one or more gaseous reactants flow co-currently over the solid catalyst.

The gaseous reactant mixture used for the start-up procedure and/or the subsequent Fischer-Tropsch process following the start-up procedure may also comprise recycled materials extracted from elsewhere, such as unreacted reactants separated from any prior catalyst reduction steps.

The feed gas used in steps i) and ii) of the start-up procedure and during the subsequent Fischer-Tropsch process of the invention is suitably passed over the catalyst bed at a gas hourly space velocity (GHSV) in the range from 100 to 10000 $h^{-1}$ (gas volumes converted to standard temperature and pressure), preferably in the range of from 125 to 9000 $h^{-1}$. In some preferred embodiments, the feed gas is passed over the catalyst bed at a gas hourly space velocity (GHSV) in the range from 5000 to 9000 $h^{-1}$, such as from 6000 to 8000 $h^{-1}$. In other preferred embodiments, the feed gas is passed over the catalyst bed at a gas hourly space velocity (GHSV) in the range from 1000 to 2000 $h^{-1}$, more preferably from 1200 to 1500 $h^{-1}$, for example 1250 $h^{-1}$.

As is well known in the art, synthesis gas, which is preferably used for the Fischer-Tropsch reaction, principally comprises carbon monoxide and hydrogen and possibly also minor amounts of carbon dioxide, nitrogen and other inert gases depending upon its origin and degree of purity. Methods of preparing synthesis gas are established in the art and usually involve the partial oxidation of a carbonaceous substance, e.g. coal. Alternatively, synthesis gas may be prepared, for example by the catalytic steam reforming of methane. The ratio of carbon monoxide to hydrogen present in the synthesis gas may be altered appropriately by the addition of either carbon monoxide or hydrogen, or may be adjusted by the so-called shift reaction well known to those skilled in the art.

The start-up procedure and/or the subsequent Fischer-Tropsch process following the start-up procedure is preferably carried out continuously in a fixed bed, fluidised bed or slurry phase reactor. When using the cobalt-containing Fischer-Tropsch catalyst in a fixed bed process the particle size should be of such shape and dimension that an acceptable pressure drop over the catalyst bed is achieved. A person skilled in the art is able to determine the particle dimension optimal for use in such fixed bed reactors. Particles of the desired shape and dimension may be obtained by extrusion of a slurry to which optionally extrusion aids and/or binders may be added.

It will be appreciated that the cobalt-containing Fischer-Tropsch synthesis catalyst resulting from the start-up procedure of the process of the present invention may be advantageously used in any subsequent Fischer-Tropsch process where an improved activity or selectivity for $C_{5+}$ hydrocarbons is desired.

Thus, according to a further aspect of the present invention, there is provided a cobalt-containing Fischer-Tropsch synthesis catalyst obtainable, preferably obtained, by the start-up procedure described previously herein.

It will be appreciated that the cobalt-containing Fischer-Tropsch synthesis catalyst may be an unsupported or a supported catalyst as described previously herein.

According to a further aspect of the invention, there is provided the use of a cobalt-containing Fischer-Tropsch synthesis catalyst as defined previously herein for increasing the selectivity of a Fischer-Tropsch process for the production of $C_5+$ hydrocarbons; and/or increasing conversion in a Fischer-Tropsch process.

According to a yet further aspect of the present invention, there is provided a method for increasing the selectivity of a Fischer-Tropsch process for the production of $C_{5+}$ hydrocarbons and/or increasing conversion in a Fischer-Tropsch process, said method comprising the step of supplying a cobalt-containing Fischer-Tropsch synthesis catalyst as defined previously herein to the Fischer-Tropsch process.

The invention will now be further described by reference to the following Examples which are illustrative only. In the Examples, CO conversion is defined as moles of CO used/moles of CO fed×100 and carbon selectivity as moles of CO attributed to a particular product/moles of CO converted× 100. Unless otherwise stated, temperatures referred to in the Examples are applied temperatures and not catalyst/bed temperatures. Unless otherwise stated, pressures referred to in the Examples are absolute pressures.

Example 1

Catalyst Preparation

The catalyst was prepared by the impregnation of a zinc oxide support with a sufficient quantity of an aqueous cobalt nitrate hexahydrate solution to achieve a cobalt loading of 10.5 wt % (this is 10.5 wt. % cobalt atoms compared to the total mass of catalyst which has been calcined but not yet reduced). The impregnated powder was extruded, dried and calcined.

Example 2 (Invention)

Start-Up Procedure at 3.3 MPa, Operation at 4.3 MPa 10 ml of the catalyst prepared in Example 1 was charged into a microreactor and a reduction was completed under hydrogen in the microreactor to form a catalyst that is at least partially reduced (10 h, 240° C., 50% $H_2/N_2$, 0.7 MPa). The gaseous supply was switched to a mixture of hydrogen and carbon monoxide ($H_2$/CO=1.8) further comprising 18% nitrogen by volume, which was introduced into the reactor at a gas hourly space velocity (GHSV) of 1250 $h^{-1}$ and at an applied temperature of 150° C. The temperature was then increased incrementally from 150° C. to 160° C. at a rate of 60° C./h, from 160 to 180 at a rate of 10° C./h, from 180 to 190 at a rate of 5° C./h before a final increase at 1° C./h to reach 60 to 65% CO conversion. This final temperature was then maintained for approximately 300 hours at a pressure of 3.3 MPa. The pressure in the reactor was then increased to 4.3 MPa and the applied temperature was varied to achieve a CO conversion level of 60 to 65% (210° C.) and maintained at this temperature throughout the Fischer-Tropsch synthesis.

Example 3 (Comparative)

Constant Operation at 4.3 MPa

The procedure of Example 2 was followed, except that a temperature of 216° C. and a pressure of 4.3 MPa were maintained from start-up and throughout the Fischer-Tropsch synthesis.

Example 4 (Invention)

Start-Up Procedure at 3.3 MPa, Operation at 4.3 MPa

The procedure of Example 2 was followed, except that the applied temperature was 229° C. during the start-up procedure and 219° C. during the subsequent Fischer-Tropsch synthesis.

Example 5 (Comparative)

Constant Operation at 4.3 MPa

The procedure of Example 3 was followed, except that the applied temperature was 219° C. throughout.

Example 6 (Invention)

Start-Up Procedure at 3.3 MPa, Operation at 4.3 MPa

The procedure of Example 2 was followed, except that the temperature was 212° C. during the start-up procedure and 213° C. during the Fischer-Tropsch synthesis.

Example 7 (Invention)

Start-Up Procedure at 3.3 MPa, Operation at 4.3 MPa

The process of Example 2 was monitored at 1560 hours on-stream at an applied temperature of 210° C.

Example 8 (Comparative)

Constant Operation at 4.3 MPa

The process of Example 3 was monitored at 1560 hours on-stream at an applied temperature of 214° C.

Example 9 (Comparative)

Constant operation at 4.3 MPa then drop to 3.3 MPa

The process of Example 8, running at 4.3 MPa was adjusted to drop the pressure from 4.3 MPa to 3.3 MPa. Data from Example 9 relates to the time period at 3.3 MPa.

Example 10 (Comparative)

Constant Operation at 3.3 MPa

The procedure of Example 3 was followed, except that the temperature was 213° C. and the pressure was 3.3 MPa throughout.

Example 11 (Invention)

Start-Up Procedure at 1.3 MPa, Operation at 4.3 MPa

The procedure of Example 2 was followed, except that the pressure was 1.3 MPa, the temperature was 220° C. and the GHVS was 800 h$^{-1}$ during the start-up procedure and the temperature was 208° C. during the Fischer-Tropsch synthesis.

Example 12 (Invention)

Start-Up Procedure at 2.3 MPa, Operation at 4.3 MPa

The procedure of Example 2 was followed, except that the pressure was 2.3 MPa and the temperature was 220° C. during the start-up procedure and the temperature was 205° C. during the Fischer-Tropsch synthesis.

CO conversion, CH$_4$ selectivity, and C$_{5+}$ selectivity data were compiled and results for the above Examples are provided in Table 1 below. Exit gasses were sampled by on-line mass spectrometry and analysed. The C$_{5+}$ selectivity is determined by difference from the C$_1$-C$_4$ components in the gas phase. The CH$_4$ selectivity is determined by difference from the C$_{2+}$ components in the gas phase. Values for CO conversion, CH$_4$ selectivity, and C$_{5+}$ selectivity are average values obtained at steady state over 200 to 700 hours on stream.

TABLE 1

| Procedure | Pressure (MPa) | CO Conversion (%) | CH$_4$ Selectivity (%) | C$_{5+}$ Selectivity (%) | Applied Temp. (° C.) |
|---|---|---|---|---|---|
| Example 2 | 3.3 (st) | 59.28 | 14.74 | 76.74 | 213 |
|  | 4.3 | 65.44 | 11.31 | 81.56 | 210 |
| Example 3 (comparative) | 4.3 | 65.69 | 15.3 | 74.05 | 216 |
| Example 4 | 3.3 (st) | 63.06 | 20.25 | 61.92 | 229 |
|  | 4.3 | 65.58 | 14.3 | 73.74 | 219 |
| Example 5 (comparative) | 4.3 | 64.6 | 18.6 | 69.1 | 219 |
| Example 6 | 3.3 (st) | 63.4 | 15.6 | 74.1 | 212 |
|  | 4.3 | 63.2 | 13.0 | 77.5 | 213 |
| Example 7 | 4.3 | 65.1 | 11.4 | 81.1 | 210 |
| Example 8 (comparative) | 4.3 | 61.4 | 13.0 | 76.9 | 214 |
| Example 9 (comparative) | 3.3 | 46.7 | 16.0 | 71.9 | 214 |
| Example 10 (comparative) | 3.3 | 65.1 | 19.9 | 69.4 | 213 |
| Example 11 | 1.3 (st) | 56.4 | 28.5 | 52.1 | 220 |
|  | 4.3 | 63 | 12.6 | 77.8 | 208 |
| Example 12 | 2.3 (st) | 64.2 | 24.5 | 60.5 | 220 |
|  | 4.3 | 62.2 | 12.0 | 79.3 | 205 |

(st) = start-up phase.
Rows in bold are post-start-up Fischer-Tropsch synthesis according to the invention The results in Table 1 show that significant improvements can be obtained by use of a start-up procedure at a pressure lower than 3.5 MPa followed by operation at a pressure of 4.0 MPa or greater. For example, at comparable levels of CO conversion, the processes using the start-up procedure of the present invention advantageously show increased C$_{5+}$ selectivity and decreased methane selectivity. For example, a comparison of Examples 2 and 3 shows that where the present start-up procedure is not followed (i.e. Example 3), in order to achieve the same level of CO conversion, a higher reaction temperature is necessary, which leads to higher CH$_4$ selectivity and lower C$_{5+}$ selectivity. As previously mentioned, this reduction in CH$_4$ selectivity and the enhanced C$_{5+}$ selectivity is vital to improving Fischer-Tropsch commercialisation. Comparison of Examples 7 and 8 also shows that this advantageous selectivity is maintained over a longer time period, with the improvement still observed after 1560 hours on stream.

Furthermore, comparison of Examples 4 and 5 shows that, using the same raised temperature during the Fischer-Tropsch synthesis, where the present start-up procedure was used (Example 4) all parameters show an improvement over the constant pressure process (Example 5). Example 6 also demonstrates improved results at an intermediate temperature between that of Examples 2 and 4.

Example 9 shows that moving from a constant 4.3 MPa process to 3.3 MPa gives a large reduction in conversion and inferior C$_{5+}$ selectivity, confirming that the start-up procedure is vital rather than the process pressure per se. Similarly, Example 10 shows that simply starting the process at 3.3 MPa and maintaining this pressure leads to lower C$_{5+}$ selectivity and higher CH$_4$ selectivity.

Examples 11 and 12 show that the start-up procedure may equally be carried out at the lower pressures of 1.3 MPa and 2.3 MPa respectively, showing improved selectivity comparable with the start-up procedure at 3.3 MPa.

Comparison of Example 10 with Examples 3 and 5 shows that, although higher methane selectivity is observed for the process at 3.3 MPa, catalyst activity overall is higher, requiring a lower temperature to reach the same level of conversion. This indicates that the catalyst undergoes better final activation at 3.3 MPa than at 4.3 MPa, which is taken advantage of in the present invention by subsequently raising the pressure after the initial lower pressure start-up procedure.

The invention claimed is:

1. A Fischer-Tropsch process for converting a feed comprising a mixture of hydrogen and carbon monoxide gases to hydrocarbons, the method comprising
    initiating the Fischer-Tropsch process by a start-up procedure comprising the steps of:
        i) providing a feed comprising a mixture of hydrogen and carbon monoxide gases to a reactor containing a cobalt-containing Fischer-Tropsch synthesis catalyst, wherein the pressure inside the reactor is 3.5 MPa absolute or below; and
        ii) maintaining the feed to the reactor, removing a product stream comprising hydrocarbons and maintaining the pressure inside the reactor at 3.5 MPa absolute or below for at least 15 hours; and
    conducting the Fischer-Tropsch process by contacting the cobalt-containing Fischer-Tropsch synthesis catalyst with the mixture of hydrogen and carbon monoxide in a reactor at a pressure of 4.0 MPa absolute or greater, and at a temperature less than a temperature in the reactor during initiating by the start-up procedure.

2. A process according to claim 1, wherein the pressure during steps i) and ii) of the start-up procedure is 3.3 MPa absolute or below, and/or wherein the pressure during steps i) and ii) of the start-up procedure is greater than 0.2 MPa.

3. A process according to claim 1, wherein the pressure in the reactor for the Fischer-Tropsch process conducted after completion of the start-up procedure is from 0.5 MPa to 3.5 MPa higher than the pressure in step (i) and/or step (ii).

4. A process according to claim 1, wherein the pressure in the reactor in step ii) of the start-up procedure is maintained for 100 to 600 hours.

5. A process according to claim 1, wherein the pressure and/or temperature in the reactor during step i) of the start-up procedure is different from the pressure and/or temperature in the reactor during step ii) of the start-up procedure.

6. A process according to claim 1, wherein the pressure in the reactor during the Fischer-Tropsch process conducted after completion of the start-up procedure is less than 10.0 MPa absolute.

7. A process according to claim 1, wherein the start-up procedure and/or the subsequent Fischer-Tropsch process following the start-up procedure is conducted at a temperature in the range of from 100 to 400° C.

8. A process according to claim 1, wherein the start-up procedure occurs in the same reactor as where the Fischer-Tropsch process is conducted after completion of the start-up procedure.

9. A process according to claim 1, wherein the cobalt-containing Fischer-Tropsch synthesis catalyst is a supported catalyst.

10. A process according claim 9, wherein the support material comprises a material selected from any of silica, alumina, silica/alumina, ceria, titania, gallia, zirconia, magnesia, zinc oxide and mixtures thereof.

11. A process according to claim 1, wherein the cobalt-containing Fischer-Tropsch synthesis catalyst comprises one or more promoters, dispersion aids, strength aids and/or binders.

12. A process according to claim 1, wherein during the Fischer-Tropsch process conducted after completion of the start-up procedure, the $C_{5+}$ selectivity is at least 70%, and/or wherein the $C_{5+}$ productivity is at least 90 g/L·h, and/or wherein the $CH_4$ selectivity is less than 15%.

13. A process according to claim 1, wherein during the Fischer-Tropsch process conducted after completion of the start-up procedure, the CO conversion is greater than 60%.

14. A process according to claim 1, wherein the process increases the selectivity of a Fischer-Tropsch process for the production of $C_{5+}$ hydrocarbons or conversion in a Fischer-Tropsch process as compared to the Fischer-Tropsch process performed without initiating by the start-up procedure.

15. A process according to claim 1, wherein the process increases the selectivity of a Fischer-Tropsch process for the production of $C_{5+}$ hydrocarbons and the conversion in a Fischer-Tropsch process as compared to the Fischer-Tropsch process performed without initiating by the start-up procedure.

16. A process according to claim 1, wherein the mixture of hydrogen and carbon monoxide gases is in the form of a synthesis gas mixture.

17. A process according to claim 1, wherein the Fischer-Tropsch catalyst is at least partially reduced prior to the start-up procedure.

18. A Fischer-Tropsch process for converting a feed comprising a mixture of hydrogen and carbon monoxide gases to hydrocarbons, the method comprising
   initiating the Fischer-Tropsch process by a start-up procedure comprising the steps of:
      i) providing a feed comprising a mixture of hydrogen and carbon monoxide gases to a reactor containing an at least partially reduced cobalt-containing Fischer-Tropsch synthesis catalyst, wherein the pressure inside the reactor is 3.5 MPa absolute or below; and
      ii) maintaining the feed to the reactor, removing a product stream comprising hydrocarbons and maintaining the pressure inside the reactor at 3.5 MPa absolute or below for at least 15 hours; and
   conducting the Fischer-Tropsch process by contacting the cobalt-containing Fischer-Tropsch synthesis catalyst with the mixture of hydrogen and carbon monoxide in a reactor at a pressure of 4.0 MPa absolute or greater.

* * * * *